(12) United States Patent
Kai et al.

(10) Patent No.: US 6,773,837 B1
(45) Date of Patent: Aug. 10, 2004

(54) FUEL CELL SYSTEM

(75) Inventors: Mitsuru Kai, Saitama (JP); Kouji Kurosaki, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/573,961

(22) Filed: May 19, 2000

(30) Foreign Application Priority Data

May 20, 1999 (JP) .......................................... 11-139366

(51) Int. Cl.$^7$ .......................... H01M 8/00; H01M 8/04; H01M 8/12
(52) U.S. Cl. .............................. 429/13; 429/23; 429/25
(58) Field of Search .............................. 429/23, 25, 13

(56) References Cited

U.S. PATENT DOCUMENTS 4,098,959 A * 7/1978 Fanciullo ..................... 429/25
4,838,020 A * 6/1989 Fujitsuka ..................... 429/23

* cited by examiner

Primary Examiner—Carol Chaney
Assistant Examiner—Julian Mercado
(74) Attorney, Agent, or Firm—Arent Fox, PLLC (57) ABSTRACT

An input signal is input to a control portion and a control signal S18a is output. The control signal S18a is supplied to a motor and driving torque of the motor is transferred to a compressor. Cathode active material "A" is compressed by the compressor and cathode active material is sent out. The cathode active material passes through a heat exchanger, a filter and a pressure sensor, and cathode active material is sent out. The cathode active material is taken into a fuel cell and reaction product S16a, S16c and S16e are discharged to generate electromotive force S16. The reaction product S16a is discharged on the basis of a level of a control signal S18b by controlling pressure by a pressure regulating valve. When a level of the control signal S18a is reduced, after a predetermined period of time has passed, the level of control signal S18b starts to be reduced.

3 Claims, 10 Drawing Sheets

FUEL CELL SYSTEM OF EMBODYMENT OF PRESENT INVENTION

FIG.1

FUEL CELL SYSTEM OF EMBODYMENT
OF PRESENT INVENTION

FIG.2

CONVENTIONAL FUEL CELL SYSTEM

FIG.3

PRESSURE IN CATHODE SIDE GAS CHAMBER 3a
IN FIG.2

FIG.4

ANOTHER CONVENTIONAL FUEL CELL SYSTEM

FIG. 5

FLOWCHART OF FIRST CONTROL MEANS OF FIG. 1

FIG.6

OPERATING CHARACTERISTIC OF
FIRST CONTROL MEANS OF FIG.1

FIG. 7

FLOWCHART OF SECOND CONTROL MEANS OF FIG.1

FIG.8

OPERATING CHARACTERISTIC OF
SECOND CONTROL MEANS OF FIG.1

FIG. 9

FLOWCHART OF THIRD CONTROL MEANS OF FIG. 1

FIG.10

OPERATING CHARACTERISTIC
OF THIRD CONTROL MEANS

FIG.11

PRESSURE IN CATHODE SIDE GAS CHAMBER 16a
IN FIG.1

FUEL CELL SYSTEM

FIELD OF THE INVENTION

The present invention relates to a fuel cell system preventing damage to fuel cell at reducing electromotive force, e.g., a case in which a fuel cell at operating is stopped suddenly.

BACKGROUND OF THE INVENTION

Conventionally, as for an art in this field, there is, e.g., Japanese Publication Patent Laid-Open No. 7-78624.

Figure 2:
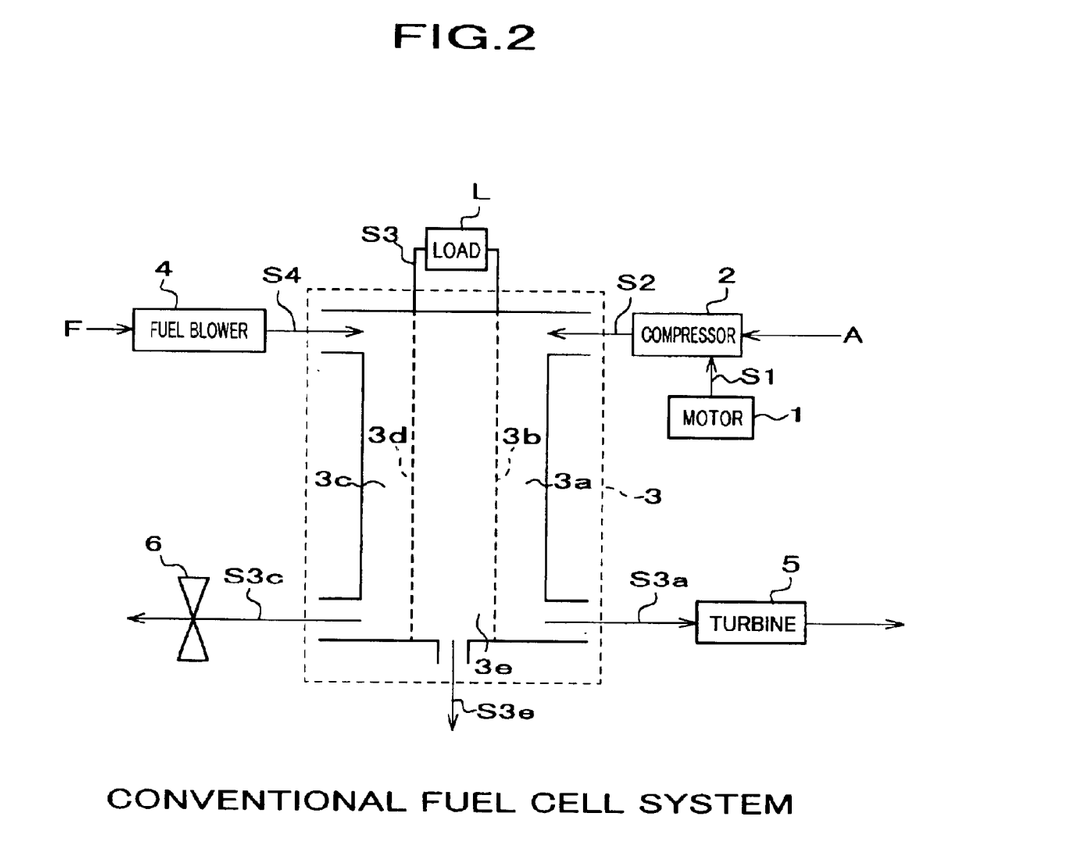
FIG. 2 is a block diagram of a conventional fuel cell system.

FIG. 2 is a schematic block diagram showing a conventional fuel cell system described in Japanese Patent Publication Laid-Open No. 7-78624.

The fuel cell system has a motor 1 generating driving torque S1. A compressor 2 is connected to the motor 1. The compressor 2 has a function taking in and compressing cathode active material A (e.g., oxygen, air or the like) and supplying cathode active material S2 whose amount depends on the number of revolutions of the motor 1. The cathode active material S2 is taken in to a fuel cell 3. A fuel blower 4 is provided in the fuel cell system and takes in anode active material F (e.g., fuel of hydrogen gas easy to undergo oxidation) and sends out anode active material S4. The anode active material S4 is taken in to the fuel cell 3. The fuel cell 3 has a cathode side gas chamber 3a, a cathode 3b, an anode side gas chamber 3c, an anode 3d and an electrolyte layer 3e between the cathode 3b and the anode 3d. The fuel cell 3 takes in the cathode active material S2 to the cathode side gas chamber 3a and takes in the anode active material S4 to the anode side gas chamber 3c. Moreover, the fuel cell 3 discharges reaction product S3a, S3c and S3e from the cathode side gas chamber 3a, the anode side gas chamber 3c and the electrolyte layer 3e, respectively, and generates electromotive force S3 between the cathode 3b and the anode 3d. Load L is connected to the cathode 3b and the anode 3d. The reaction product S3a is discharged via a turbine 5. The reaction product S3c is discharged by controlling pressure by a control valve 6.

Next, operation of FIG. 2 will now described.

The cathode active material A is taken in to the compressor 2 and compressed, and the cathode active material S2 whose amount depends on the number of revolutions of the motor 1 is sent out from the compressor 2. The cathode active material S2 is taken in to the fuel cell 3. The anode active material F is taken in to the fuel blower 4 and the anode active material S4 is sent out to the fuel cell 3. The fuel cell 3 takes in the cathode active material S2 the cathode side gas chamber 3a and takes in the anode active material S4 to the anode side gas chamber 3c. Moreover, the fuel cell 3 discharges the reaction product S3a, S3c and S3e from the cathode side gas chamber 3a, the anode side gas chamber 3c and the electrolyte layer 3e, respectively, and generates electromotive force S3 between the cathode 3b and the anode 3d.

The electromotive force S3 is controlled on the basis of the number of revolutions of the motor 1 and opening of the control valve 6 and supplied to the load L. The reaction product S3a is discharged via the turbine 5 and the reaction product S3c is discharged by controlling pressure by the control valve 6.

However, the conventional fuel cell system in FIG. 2 has a following problem.

Figure 3:
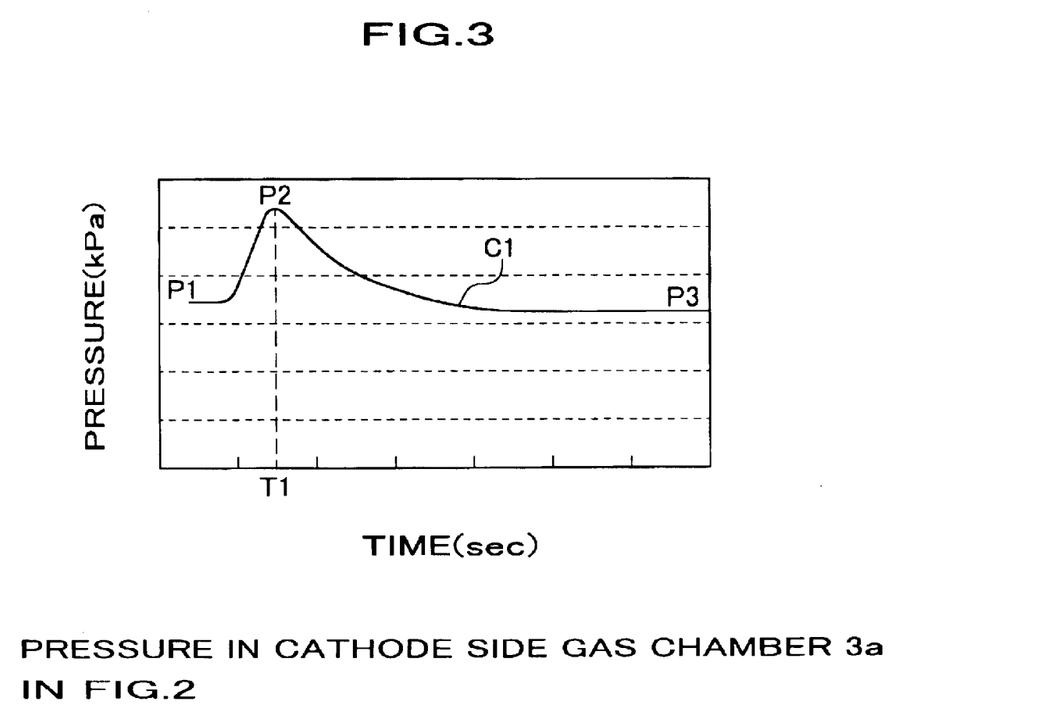
FIG. 3 is a characteristic view of pressure in a cathode side gas chamber 3a in FIG. 2.

FIG. 3 is a characteristic view showing a generation state of overshoot in pressure of the cathode active material S2 and the reaction product S3a in the cathode side gas chamber 3a in FIG. 2. A vertical axis is pressure and a horizontal axis is time.

In the fuel cell system in FIG. 2, when a command for changing the electromotive force S3 is input, the time required for reducing the number of revolutions of the motor 1, from 8000 rpm to 0 rpm of a target value is 1 second and the time required for reducing the opening of the control valve 6, e.g., from 80° to 0° of a target value is 0.01 second. Specifically, before the motor 1 is stopped the control valve 6 is closed. Therefore, as shown in a characteristic curve C1 in FIG. 3, pressure of the cathode active material S2 and the reaction product S3a in the cathode side gas chamber 3a is P1 kPa at operating. After a lapse of T1 second since an operation stopping command (i.e., 0 second), the pressure is P2 kPa and overshoot is generated. The pressure is reduced gradually and becomes P3 kPa (where P2>>P3). When overshoot is generated, cathode-anode differential pressure between the cathode side gas chamber 3a and the anode side gas chamber 3c is wider than a permissible value and there is a case in which the fuel cell 3 is damaged and destroyed. To solve this problem, Japanese Patent Publication Laid-Open No. 7-78624 proposes a fuel cell system as shown in FIG. 4.

Figure 4:
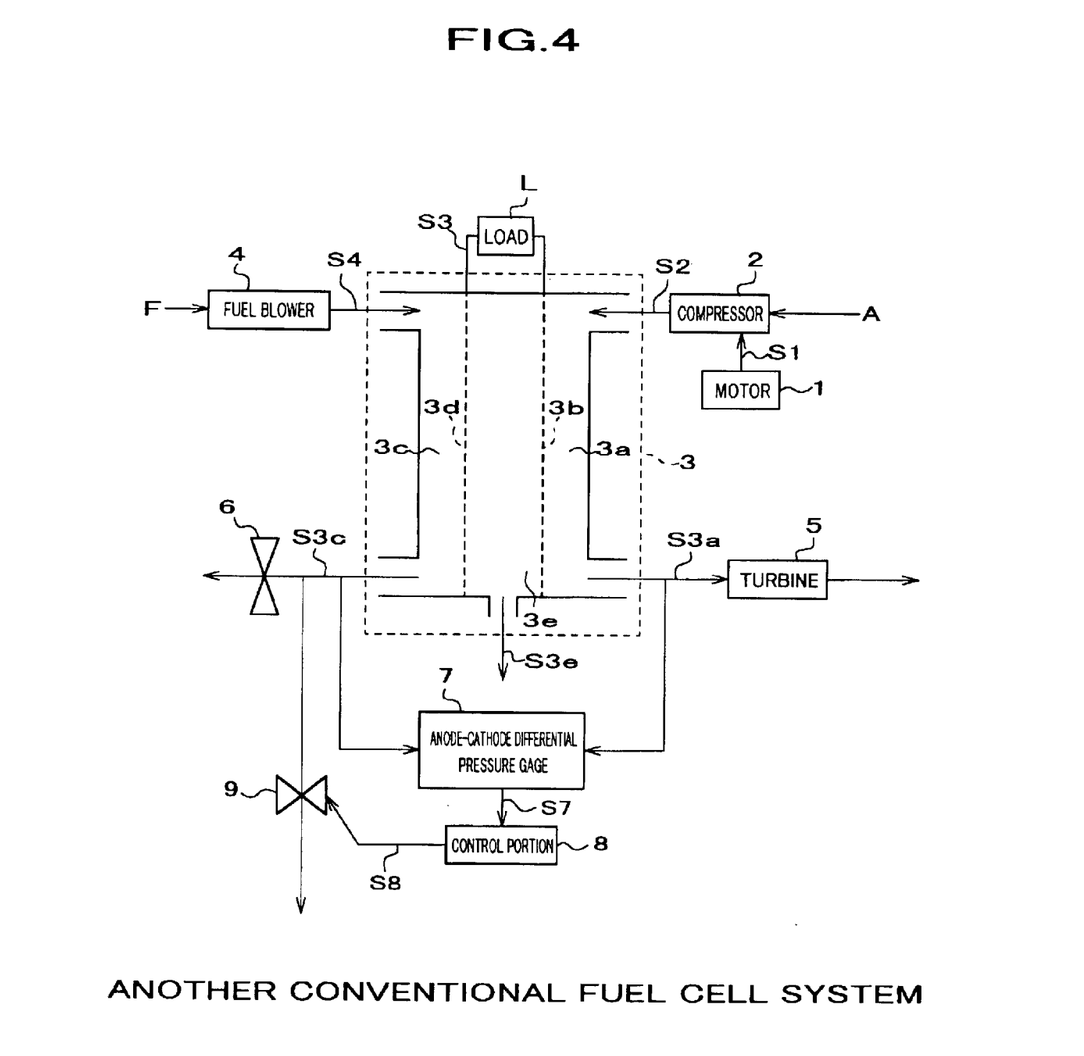
FIG. 4 is a block diagram of another conventional fuel cell system.

FIG. 4 is a schematic block diagram showing another conventional fuel cell system described in Japanese Patent Laid-Open No. 7-78624.

The fuel cell system has a cathode-anode differential pressure gage 7 added to the fuel cell system in FIG. 2. Reaction product S3a and S3c are taken in to the cathode-anode differential pressure gage 7 and differential pressure between the cathode side gas chamber 3a and the anode side gas chamber 3c is measured to output measured result S7. A control portion 8 is connected to an output side of the cathode-anode differential pressure gage 7. The measured result S7 is input to the control portion 8 and a control signal S8 at a level proportional to the measured result S7 is output from the control portion 8. A cathode-anode differential pressure valve 9 is connected to an output side of the control portion 8. The control signal S8 is input to the cathode-anode differential pressure valve 9 and the S3c is discharged from the cathode-anode differential pressure valve 9 at an opening proportional to the control signal S8. Therefore, differential pressure between the cathode side gas chamber 3a and the anode side gas chamber 3c is kept within a permissible value and the fuel cell 3 is prevented from being damaged and destroyed. However, the fuel cell system has a problem that the fuel cell system has a cathode-anode differential pressure gage 7, the control portion 8 and the cathode-anode differential pressure valve 9 added to the fuel cell system in FIG. 2 therefore the number of parts is large and structure is complex.

SUMMARY OF THE INVENTION

To solve the above-described problem the present invention provides a fuel cell system comprising:

a supply means taking in cathode active material, supplying the cathode active material proportional to a level of a first control signal and detecting a flow rate of the cathode active material to generate a flow rate detecting signal;

a fuel cell having a cathode side gas chamber, a cathode, an anode side gas chamber, an anode and an electrolyte layer between the cathode and the anode, taking in the cathode active material supplied by the supplying means to the cathode side gas chamber, taking in given anode active material to the anode side gas chamber, discharging first and second reaction product from the cathode side gas chamber and the anode side gas chamber, respectively, and generating electromotive force between the cathode and the anode a pressure regulating means having a pressure regulating valve regulating pressure at discharging the first reaction product on the basis of a level of a second control signal and detecting an opening of the pressure regulating valve to generate an opening detecting signal.

The input signal indicating the target electric power of the fuel cell inputs the control means and the control means decides the target value of a flow rate of the cathode active material and the target value of the opening of the pressure regulating valve in accordance with the input signal. The first control signal in accordance with the flow rate of the cathode active material and the second control signal in accordance with the target value of the opening of the pressure regulating valve are output The cathode active material is taken in to the supplying means, the flow rate of the cathode active material proportional to the level of the first control signal is supplied and the flow rate detecting signal indicating a flow rate of the cathode active material is generated. The target value of a flow rate of the cathode active material and is compared with the flow rate detecting signal by the control means, and when the flow rate detecting signal is larger than the target value of the flow rate, the first control signal for reducing the flow rate of the cathode active material is output, and when the target value of the flow rate is larger than the flow rate detecting signal, the first control signal for increasing the flow rate of the cathode active material is output.

The cathode active material supplied by the supplying means is taken in to the cathode side gas chamber of the fuel cell and the anode active material is taken in to the anode side gas chamber. The first and second reaction product are discharged from the cathode side gas chamber and the anode side gas chamber, respectively, and electromotive force is generated between the cathode and the anode. The pressure at discharging the first reaction product is adjusted by the pressure regulating valve on the basis of a level of a second control signal and an opening detecting signal indicating an opening of the pressure regulating valve is generated. The target value of the opening of the pressure regulating valve is compared with the opening detecting signal by the control means, and when the opening detecting signal is larger than the target value of the opening, the second control signal for reducing the opening is output, and when the target value of the opening is larger than the opening detecting signal, the second control signal for increasing the opening is output.

When the target electric power is reduced, e.g., in a case in which the fuel cell at operating is stopped suddenly, in the first control means, after a predetermined period of time has passed since a time of starting to reduce the level of the first control signal, the level of second control signal starts to be reduced. In the second control means, reducing speed of the level of the second control signal is decreased at a uniform ratio with respect to reducing speed of the level of the first control signal. In the third control means, after a predetermined period of time has passed since a time of starting to reduce the level of the first control signal, the level of second control signal starts to be reduced, and reducing speed of the level of the second control signal is decreased at a uniform ratio with respect to reducing speed of the level of th first control signal.

DESCRIPTION OF THE PREFERRED EMBODIMENTS

Figure 1:
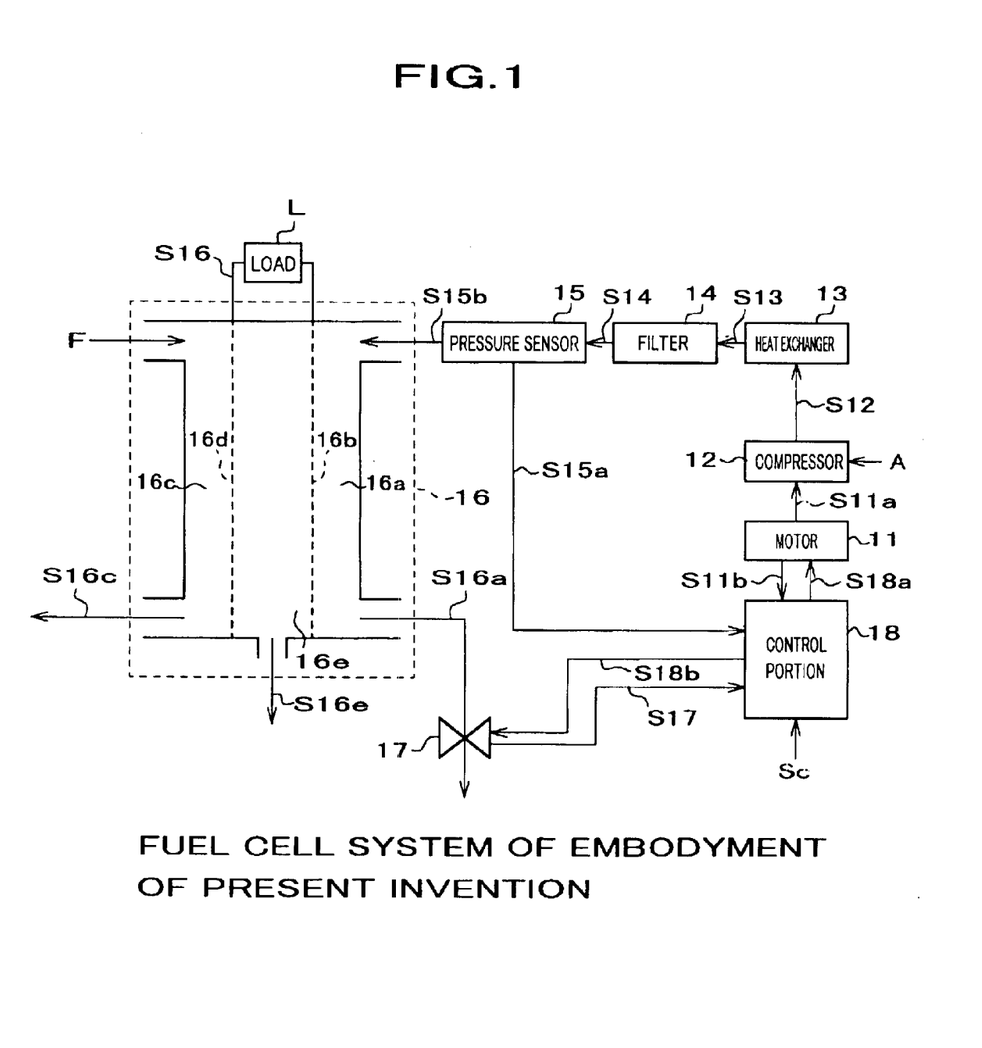
FIG. 1 is a block diagram of a fuel cell system of an embodiment of the present invention.

FIG. 1 is a block diagram showing an example of a fuel cell system of an embodiment of the present invention.

The fuel cell system has a motor 11 for generating driving torque S11$a$ proportional to a level of a first control signal 18$a$. The motor 11 is provided with a sensor (not shown) for detecting a number of revolutions and generating a flow rate detecting signal S11$b$ in accordance with the number of revolutions. A compressor 12 is connected to the motor 11. The compressor 12 has the function of taking in and compressing cathode active material A such as, e.g., oxygen or air and supplying a flow rate of cathode active material S12 in accordance with the number of revolutions of the motor 11 by the driving torque S11$a$. The cathode active material S12 is taken in to a heat exchanger 13. The heat exchanger 13 has the function of cooling the cathode active material S12 and generating a cathode active material S13. The cathode active material S13 is taken to a filter 14 filtering the cathode active material S13 and sending out a cathode active material S14. The cathode active material S14 is taken to a pressure sensor 15. The pressure sensor 15 takes in the cathode active material S14, detects pressure to generate a pressure detecting signal S15$a$ and sends out a cathode active material S15$b$. The motor 11, the compressor 12, the heat exchanger 13, the filter 14 and the pressure sensor 15 form a supplying means. The cathode active material S15$b$ is taken to a fuel cell 16.

The fuel cell 16 has a cathode side gas chamber 16$a$, a cathode 16$b$, an anode side gas chamber 16$c$, an anode 16$d$ and an electrolyte layer 16$e$ between the cathode 16$b$ and the anode 16$d$, takes in the cathode active material S15$b$ to the cathode side gas chamber 16$a$, takes in given anode active material F to the anode side gas chamber 16$c$, discharges first reaction product S16$a$, second reaction product S16$c$ and reaction product S16$e$ from the cathode side gas chamber 16$a$, the anode side gas chamber 16$c$ and the electrolyte layer 16$e$, respectively, and generates electromotive force S16$b$ between the cathode 16$b$ and the anode 16$d$. A load L is connected to the cathode 16$b$ and the anode 16$d$. The reaction product S16$a$ is discharged by controlling pressure by a pressure regulating means 17 (e.g., pressure regulating valve). The pressure regulating valve 17 has the function of regulating pressure at discharging the reaction product S16$a$ on the basis of a level of a second control signal S18$b$ and detecting opening of the pressure regulating valve 17 to generate an opening detecting signal S17. A control means (e.g., control portion) 18 is connected to the motor 11, the pressure sensor 15 and the 15 pressure regulating valve.

An input signal Sc indicating a target electric power S16 of the fuel cell 16 is input to the control portion 18 and the control portion 18 has the function of carrying out a first control signal generating means in which the control signal S18a is generated and output and a second control signal generating means in which the control signal S18b is generated and output. Moreover, the control portion 18 has the function of stopping the first and second control signal generating means when the pressure detecting signal S15a is larger than a predetermined threshold value. Furthermore, the control portion 18 carries out a first control means in which after a predetermined period of time has passed since a time of starting to reduce the level of the control signal S18a, the level of control signal S18b starts to be reduced, a second control means in which reducing speed of the level of the control signal S18b is decrees d at a uniform ratio with respect to reducing speed of the level of the control signal S18a, or a third control means in which the first control means and the second control means are combined.

Figure 5:
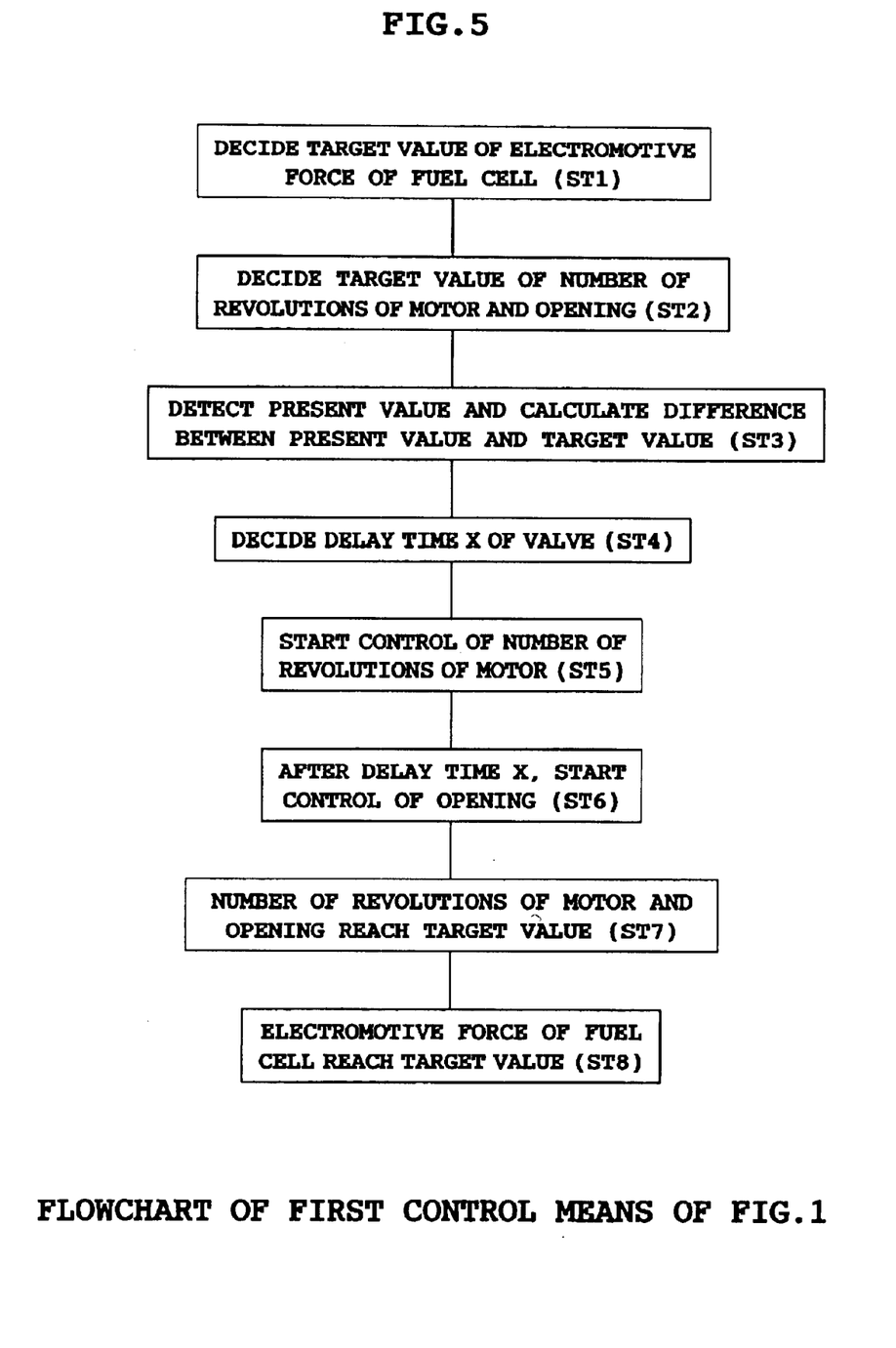
FIG. 5 is a flowchart of a first control means of FIG. 1.
Figure 6:
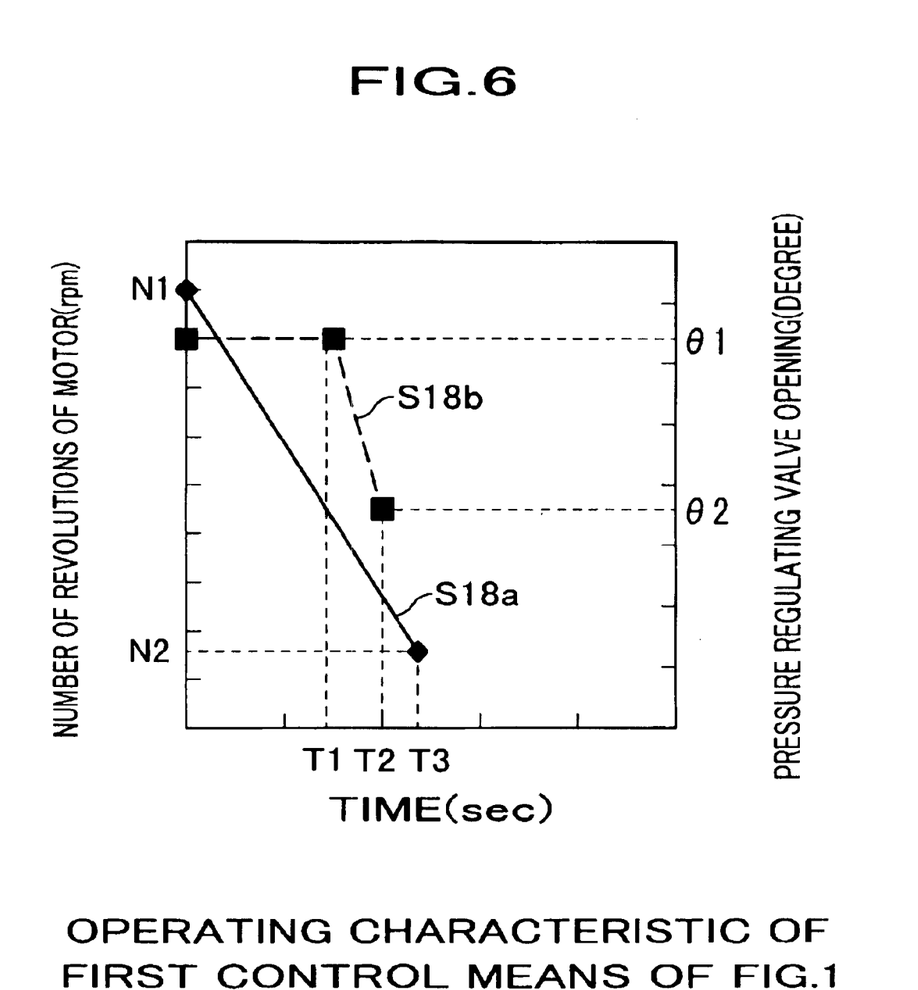
FIG. 6 is an operating characteristic view of a first control means of FIG. 1.
Figure 7:
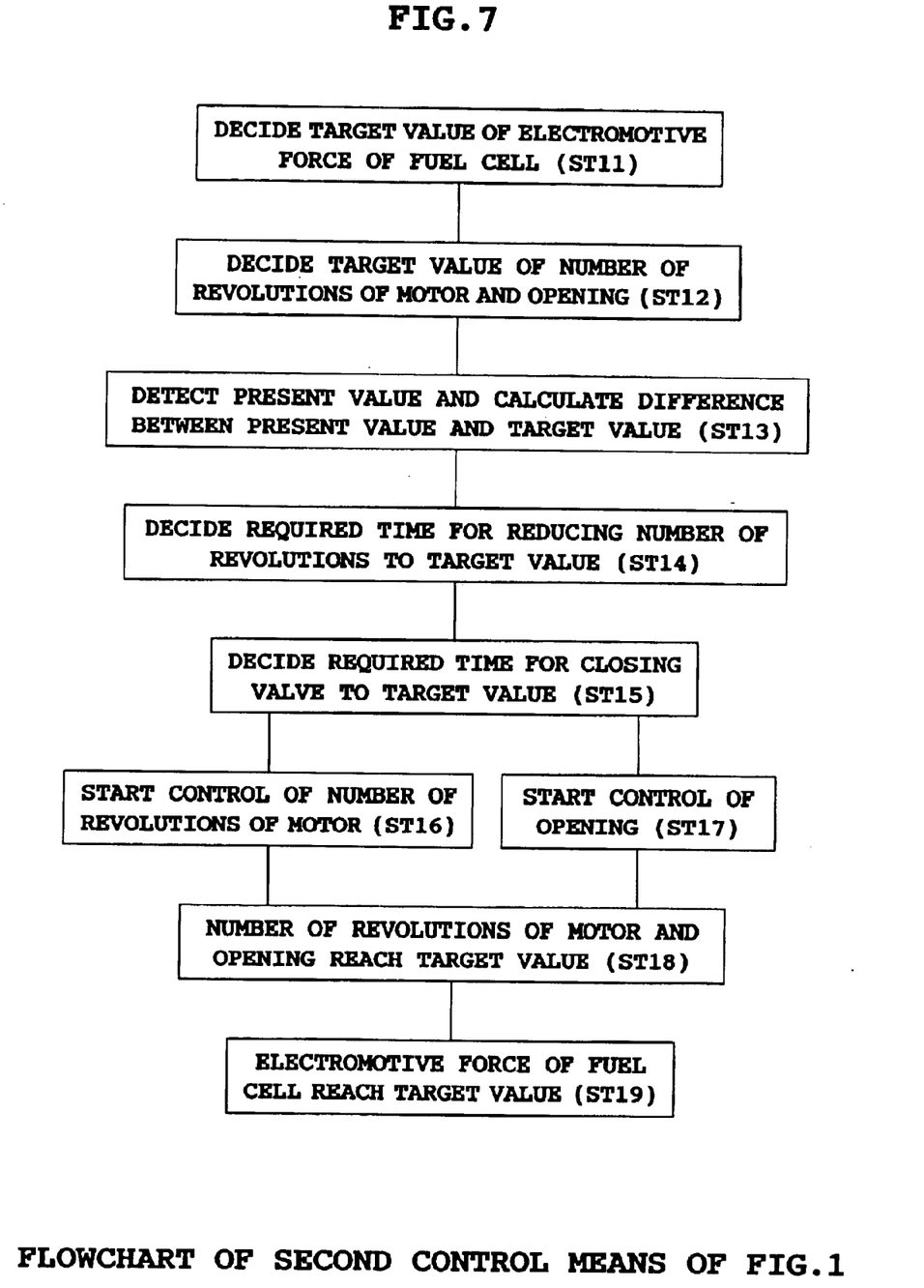
FIG. 7 is a second flowchart of a second control means of FIG. 1.
Figure 8:
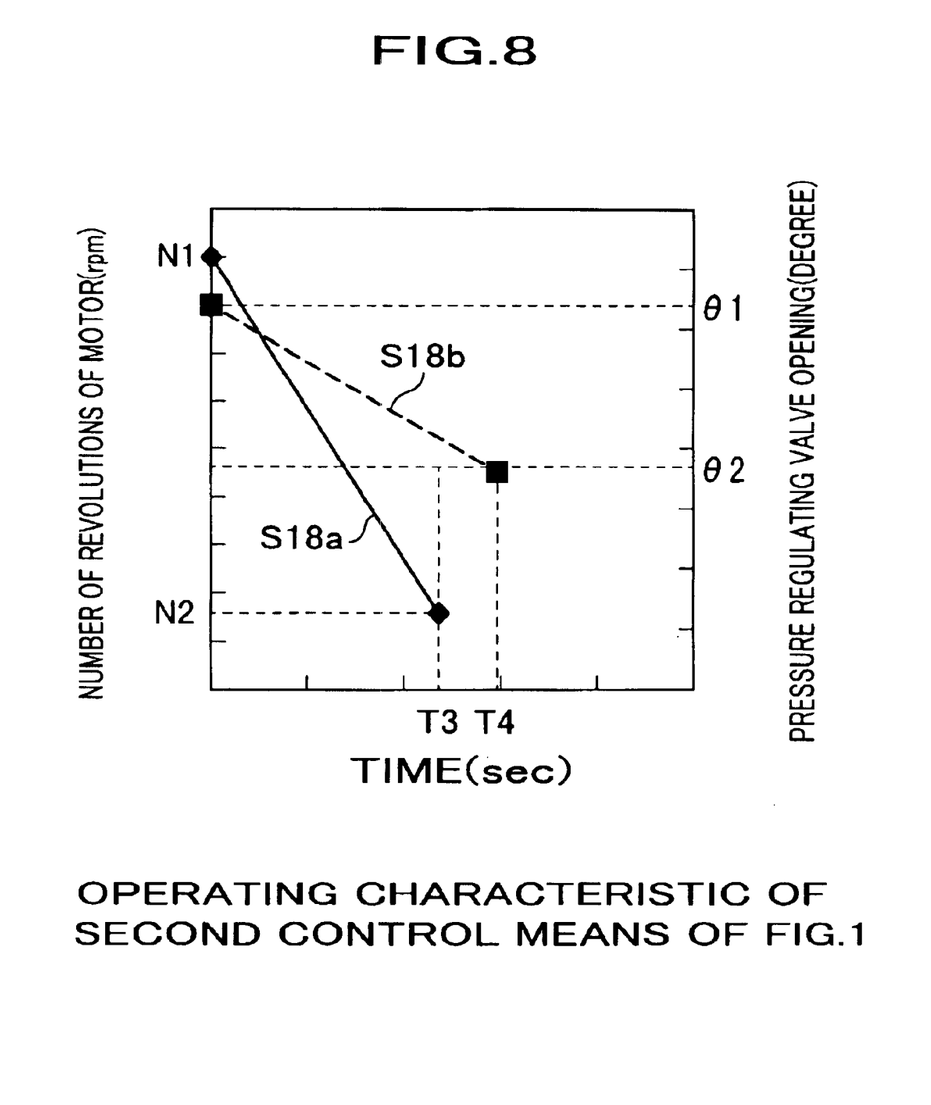
FIG. 8 is an operating characteristic view of a second control means of FIG. 1.
Figure 9:
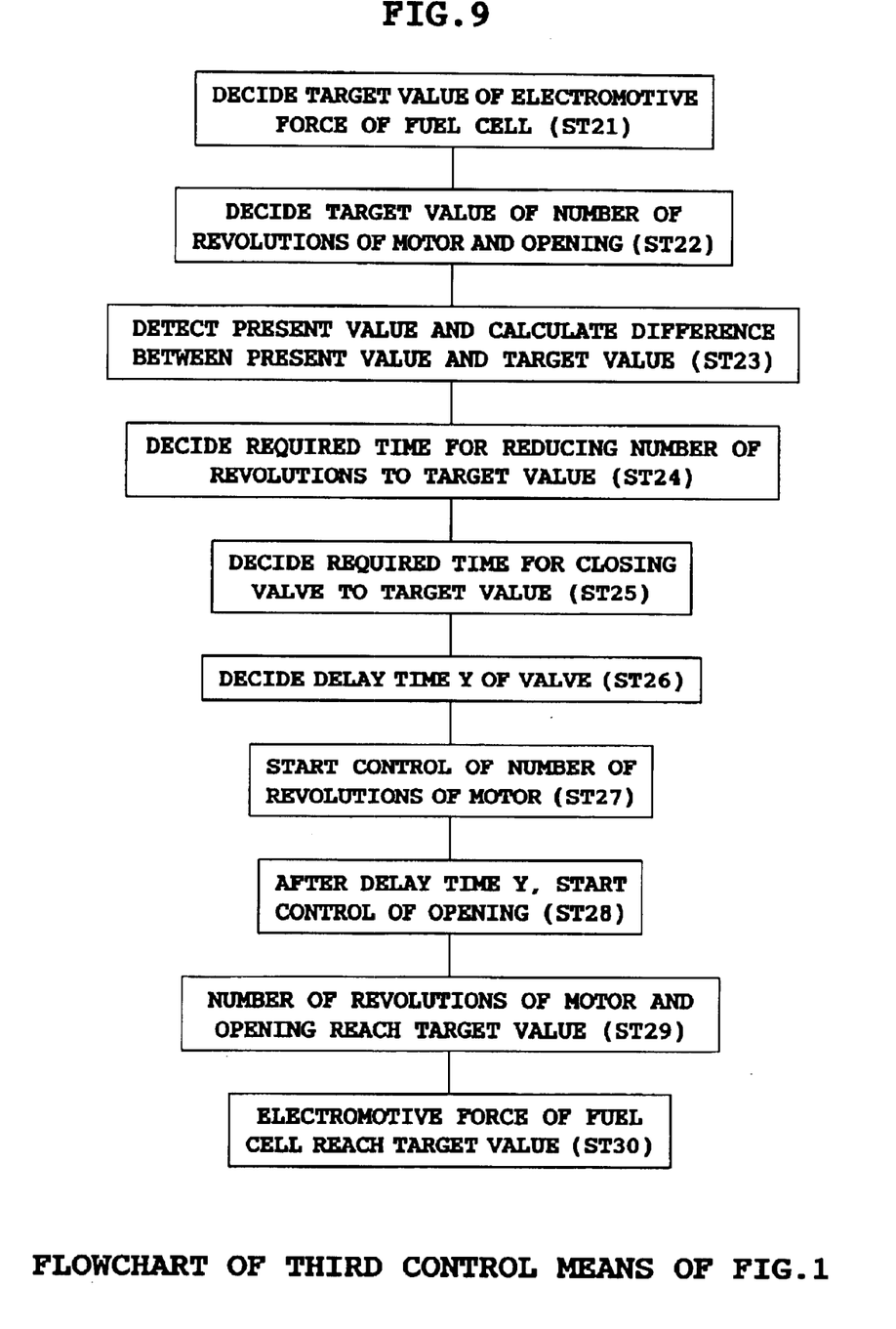
FIG. 9 is a third flowchart of a third control means of FIG. 1.
Figure 10:
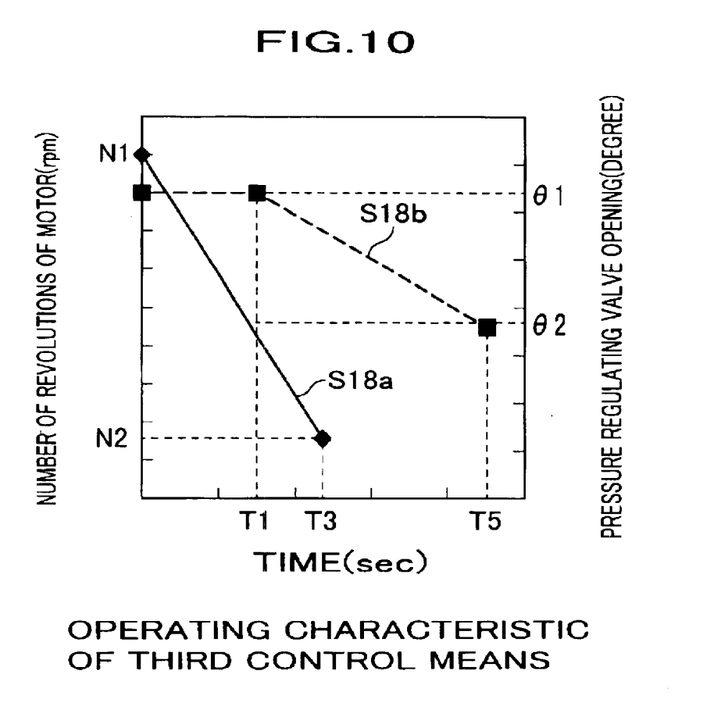
FIG. 10 is an operating characteristic view of a third control means of FIG. 1.
Figure 11:
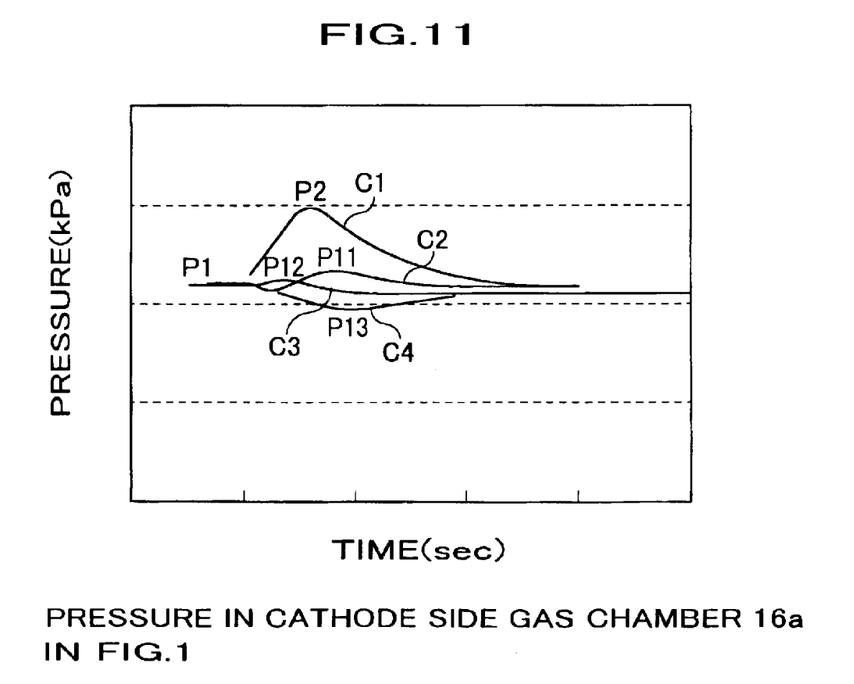
FIG. 11 is a characteristic view of pressure in a cathode side gas chamber 16a in FIG. 1.

FIG. 5 is a flowchart for describing operation of a first control means of FIG. 1. FIG. 6 is an operating characteristic view of a first control means of FIG. 1. FIG. 7 is a flowchart for describing operation of a second control means of FIG. 1. FIG. 8 is an operating characteristic view of a second control means of FIG. 1. FIG. 9 is a flowchart for describing operation of a third control means of FIG. 1. FIG. 10 is an operating characteristic view of a third control means of FIG. 1. FIG. 11 is a characteristic view of pressure in a cathode side gas chamber 16a in FIG. 1. In FIG. 6, 8 and 10, a left side vertical axis is the number of revolutions of the motor 11, a right side vertical axis is the opening of the pressure regulating valve 17 and a horizontal axis is time. In FIG. 11, a vertical axis is pressure and a horizontal axis is time.

Operation (1)–(5) of FIG. 1 will now be described by referring to these drawings.

(1) Operation of the First Control Signal Generating Means

The input signal Sc indicating a target electric power of the fuel cell is input to the control portion 18 and the control signal S18a is output from the control portion 18. The control signal S18a is supplied to the motor 11 and the driving torque S11a proportional to a level of the control signal S18a is generated from the motor 11. The flow rate detecting signal S11b in accordance with the number of revolutions is output from the motor 11. In this case, the control portion 18 decides a target value of a flow rate of the cathode active material S15b, which is supplied by the motor, and a target value of the opening of the pressure regulating valve 17 in accordance with the input signal Sc indicating the target electric power of the fuel cell. The target value of the flow rate is compared with the flow rate detecting signal S11b, and when the flow rate detecting signal S11b is larger than the target value of the flow rate, the control signal S18a for reducing the cathode active material S15b is output. When the target value of the flow rate is larger than the flow rate detecting signal S11b the control signal S18a for increasing the cathode active material S15b is output. The driving torque S11a is transferred to the compressor 12 and the cathode active material A is taken in to the compressor 12 and compressed to send out the cathode active material S12.

The cathode active material S12 is taken into the heat exchanger 13 and cooled, and the cathode active material S13 is sent out from the heat exchanger 13. The cathode active material S13 is taken into the filter 14 and filtered, and the cathode active material S14 is sent out from the filter 14. The cathode active material S14 is taken in to the pressure sensor 15 to detect pressure, and the pressure detecting signal S15a and the cathode active material S15b are sent out The cathode active material S15b is taken into the fuel cell 16. In the fuel cell 16, the cathode active material S15b is taken in to the cathode side gas chamber 16a and the anode active material F is taken in to the anode side gas chamber 16c. The reaction product S16a, S16c and S16e are discharged from the cathode side gas chamber 16a, the anode side gas chamber 16c and the electrolyte layer 16e, respectively, and the electromotive force S16 is generated between the cathode 16b and the anode 16d, the electromotive force S16 is supplied to the load L.

(2) Operation of the Second Control Signal Generating Means

The reaction product S16a is discharged by controlling pressure by the pressure regulating valve 17 on the basis of th level of the control signal S18b. In this case, the control portion 18 compares the target value of the opening of the pressure regulating valve 17 with the opening detecting signal S17, and when the opening detecting signal S17 is larger than the target value of the opening, the control signal S18b for reducing the opening is output. When the target value of the opening is larger than the opening detecting signal S17, the control signal S18b for increasing the opening is output. The pressure detecting signal S15a is input to the control portion 18 and compared with the predetermined threshold value, and when the detecting signal S15a is larger than the predetermined threshold value, the first and second control signal generating means is stopped.

(3) Operation of the First Control Means

In operation of the first control means, when the control signal S18a to the motor 11 for driving the compressor 12 is reduced on the basis of the change of the input signal Sc indicating the target electric power of the fuel cell, e.g., a case in which a fuel cell 16 at operating is stopped suddenly, after a predetermined period of time (e.g., T1 second) has passed since a time of starting to reduce the control signal S18a to the motor 11, the control signal S18b to the pressure regulating valve 17 starts to be reduced. Specifically, as shown in FIG. 5, the target electric power Sc, which is the target value of the electromotive force S16 supplying to the load L of the fuel cell 16 is [decided] input (ST1) and the target values of the number of revolutions of the motor 11 and the opening are decided on the basis of the target electric power Sc (ST2). Sequentially, present values of the number of revolutions of the motor 11 and the opening degree of the pressure regulating valve 17 are detected and differences between the present values and the target values are calculated (ST3). Delay time X of the pressure regulating valve 17 is decided (ST4) and control of the number of revolutions of the motor 11 is started (ST5). After the predetermined delay time X has passed, control of the opening degree of the pressure regulating valve 17 is started (ST6). The number of revolutions of the motor 11 and the opening degree of the pressure regulating valve 17 reach the target value (ST7) and the electromotive force S16 of the fuel cell reaches the target value (ST8). Therefore, e.g., as shown in FIG. 6, at the time of starting to reduce the control signal S18a to the motor 11

(i.e., 0 second), the number of revolutions of the motor 11 is N1 rpm and reduced to N2 rpm after T3. On the other hand, the time of starting to reduce the control signal 818b of the pressure regulating valve 17 is set at T1, which is the predetermined delay time from the time of starting to reduce the control signal S18a. The opening of the pressure regulating valve 17 is 01 degree at T1 and reduced to B 2 degree at T2. As discussed above, the opening degree of the pressure regulating valve 17 can be controlled in accordance with a delay of response of the motor 11 so that pressure difference between anode side and cathode side is prevented from being excessively increased.

(4) Operation of the Second Control Means

In operation of the second control means, when the control signal S18a to the motor 11 for driving the compressor 12 is reduced on the basis of the change of the input signal Sc indicating the target electric power of the fuel cell, reducing the speed of the control signal S18b to the pressure regulating valve 17 is controlled to be decreased at a uniform ratio (e.g., 1.25 times) with respect to reducing speed of the level of the control signal S18a to said motor 11. Specifically, as shown in FIG. 7, the target electric power, which is the target value of the electromotive force S16 supplying to the load L of the fuel cell 16 is input (ST11) and the target values of the number of revolutions of the motor 11 and the opening are decided on the basis of the target electric power Sc (ST12). Sequentially, present values of the number of revolutions of the motor 11 and the opening degree of the pressure regulating valve 17 are detected and differences between the present values and the target values are calculated (ST13). Required time for reducing the number of revolutions of the motor 11 to the target value is decided (ST14) and required time for closing the pressure regulating valve 17 to the target value is decided (ST15). Control of the number of revolutions of the motor 11 is 5 started (ST16) and control of the opening degree of the pressure regulating valve 17 is started (ST17). The number of revolutions of the motor 11 and the opening degree of the pressure regulating valve 17 reach said target value (ST18) and the electromotive force S16 reaches the target value (ST19). Therefore, e.g., as shown in FIG. 8, at the time of starting to reduce the level of the control signal S18a to the motor 11 (i.e., 0 second), the number of revolutions of the motor 11 is N1 rpm and reduced to N2 rpm after T3. On the other hand, at the time of starting to reduce the control signal S18b to the pressure regulating valve 17 (i.e., 0 second), the opening of the pressure regulating valve 17 is θ1 degree and reduced to θ2 degree at T4. As discussed above, the opening degree of the pressure regulating valve 17 can be controlled in accordance with a delay of response of the motor 11 so that pressure difference between anode side and cathode side is prevented from being excessively increased.

(5) Operation of the Third Control Means

In operation of the third control means, the operation of the first control means and the operation of the second control means are combined. Specifically, after a predetermined period of time (e.g., T1 second) has passed since a time of starting to reduce the level of the control signal S18a, to the motor 11 reducing speed of the control signal S18b to the pressure regulating valve 17 is controlled to be decreased at a uniform ratio (e.g., 1.25 times) with respect to reducing speed of [the level of] the control signal S18a to said motor 11. Specifically, as shown in FIG. 9, the target electric power Sc, which is the target value of the electromotive force S16 supplying to the load L of the fuel cell 16 is input (ST21) and the target values of the number of revolutions of the motor 11 and the opening are decided on the basis of the target electric power Sc (ST22). Sequentially, present values of the number of revolutions of the motor 11 and the opening degree of the pressure regulating valve 17 are detected and differences between the present values and the target values are calculated (ST23). Required time for reducing the number of revolutions of the motor 11 to the target value is decided (ST24) and required time for closing the pressure regulating valve 17 to the target value is decided (ST25). Delay time Y of the pressure regulating valve 17 is decided (ST26) and control of the number of revolutions of the motor 11 is started (ST27). After the predetermined delay time X has passed, control of the opening degree of the pressure regulating valve 17 is started (ST28). The number of revolutions of the motor 11 and the opening degree of the pressure regulating valve 17 reach said target value (ST29) and the electromotive force S16 reaches the target value (ST30). Therefore, e.g., as shown in FIG. 10, at the time of starting to reduce the control signal S18a to the motor 11 (i.e., 0 second), the number of revolutions of the motor 11 is N1 rpm and reduced to N2 rpm after T3. On the other hand, the time of starting to reduce the control signal S18b to the pressure regulating valve 17 is set at T1 which is the predetermined delay time from the time of starting to reduce the level of the control signal S18a. The opening of the pressure regulating valve 17 is θ1 degree at T1 and reduced to θ2 degree at T5. As discussed above, the opening degree of the pressure regulating valve 17 can be controlled in accordance with a delay of response of the motor 11 so that pressure difference between anode side and cathode side is prevented from being excessively increased. In cases in which the first, second and third control means are carried out, pressure of the cathode active material S15b and the reaction product S16a in the cathode side gas chamber 16a are, as characteristic curves C1, C2 and C3 shown in FIG. 11, P11 kPa, P12 kPa and P13 kPa, respectively, with respect to P1 kPa. These are reduced substantially from overshoot of P2 kPa in a conventional characteristic curve C1.

As described above, in operation of the first control means of the present embodiment, after a predetermined period of time has passed since the time of starting to reduce the level of the control signal S18a, the level of the control signal S18b starts to be reduced. Therefore, overshoot of pressure of the cathode active material S15b and the reaction product S16a in the cathode side gas chamber 16a is reduced and the fuel cell 16 is prevented from being broken. In operation of the second control means, reducing speed of the level of the control signal S18b is controlled to be decreased at a uniform ratio with respect to reducing speed of the level of the control signal S18a. Therefore, as with operation of the first control means, overshoot of pressure of the cathode active material S15b and the reaction product S16a in the cathode side gas chamber 16a is reduced and the fuel cell 18 is prevented from being broken. In operation of the third control means, the operation of the first control means and the operation of the second control means are combined. Therefore, overshoot of pressure of the cathode active material S15b and the reaction product S16a in the cathode side gas chamber 16a is reduced further and the fuel cell 16 is prevented from being broken. Moreover, the fuel cell system does not required a conventional cathode-anode differential pressure gage 7 and cathode-anode differential pressure valve 9. Therefore, the fuel cell system with comparatively simple stricture is provided, which is prevented from damage at inputting a command for changing electromotive force of the fuel cell at operating.

The present invention is not limited to the above-described embodiments and can be modified variously. As for a modification, there is, e.g./the following modification.

(a) In the first control means of the present embodiment, a period of time from the time of starting to reduce the level of the control signal S18a to the time of starting to reduce the level of the control signal S18b is not limited to T1 second and may be any period of time.

(b) In operation of the second control means, the ratio of reducing speed of the level of the control signal S18b with respect to reducing speed of the level of the control signal S18a is not limited to 1.25 times and maybe any ratio.

As described above in detail, according to the present invention, in the first control means, after a predetermined period of time has passed since the time of starting to reduce a level of a first control signal, a level of a second control signal starts to be reduced. Therefore, overshoot of pressure of cathode active material and reaction product in cathode side gas chamber of the fuel cell is reduced and fuel cell is prevented from being broken. In operation of the second control means, reducing speed of the level of the second control signal is controlled to be d creased at [an] a uniform ratio with respect to reducing speed of the level of the first control signal. Therefore, as with operation of the first control means, overshoot of pressure of the cathode active material and the reaction product in the cathode side gas chamber is reduced and the fuel cell is prevented from being broken. In operation of the third control means, the operation of the first control means and the operation of the second control means are combined. Therefore, overshoot of pressure of the cathode active material S15b and the reaction product in the cathode side gas chamber are reduced further and the fuel cell 16 is prevented from being broken. Moreover, the fuel cell system does not required a cathode-anode differential pressure gage and cathode-anode differential pressure valve mounted on a conventional fuel cell. Therefore, the fuel cell system with comparatively simple structure is provided, which is prevented from damage in an emergency stop state of the fuel cell at operating.

What is claimed is:

1. A fuel cell control system comprising at least one fuel cell having an anode and a cathode, comprising;

an air supplying compressor, provided on an air-intake side of said fuel cell, for supplying pressurized air to an inlet of a cathode of said fuel cell, a pressure regulating valve, provided on an air discharging side of said fuel call, for regulating pressure of reactant gas discharged from said cathode of said fuel cell, a control means for deciding a target electric power of said fuel cell when a present target electric power of said fuel cell is changed, said control means for deciding and calculating a control amount of said air supplying compressor and a control amount of said pressure regulating valve on the basis of the target electric power of fuel cell, said control means for changing the control amount of said air supplying compressor at the onset of when said target electric power of fuel cell is changed, and, said control means for changing the control amount of said pressure regulating valve so as to adjust a pressure of air at the inlet of the cathode of said fuel cell to a suitable value after a predetermined time has passed when the control amount of said air supplying compressor starts to be changed.

2. A fuel cell control system comprising at least one fuel cell having an anode and a cathode, comprising;

an air supplying compressor, provided on an air-intake side of said fuel cell, for supplying pressurized air to an inlet of the cathode of said fuel cell, a pressure regulating valve, provided on an air discharging side of said fuel cell, for regulating pressure of reactant gas discharged from said cathode of said fuel cell, a control means for deciding a target electric power of said fuel cell when a present target electric power of said fuel cell is changed, said control means for deciding and calculating a control amount of said air supplying compressor and a control amount of said pressure regulating valve on the basis of the target electric power of said fuel cell, said control means for changing the control amount of said air supplying compressor at the onset of when said target electric power of fuel cell is changed, and said control means for reducing a changing speed of the control amount of said press re regulating valve so as to adjust a pressure of air at the inlet of the cathode of said fuel cell to a suitable value at a constant proportion when the control amount of said air supplying compressor starts to be changed.

3. A fuel cell control system comprising at least one fuel cell having an anode and a cathode, comprising;

an air supplying compressor, provided on an air-intake side of said fuel cell, for supplying pressurized air to an inlet of a cathode of said fuel cell, a pressure regulating valve, provided on an air discharging side of said fuel cell, for regulating pressure of reactant gas discharged from said cathode of said fuel cell, a control means for deciding a target electric power of the fuel cell when a present target electric power of the fuel cell is changed, said control means for deciding and calculating a control amount of said air supplying compressor and a control amount of said pressure regulating valve on the basis of the target electric power of said fuel cell, said control means for changing the control amount of said air supplying compressor at the onset of when said target electric power of fuel cell is changed, and said control means in combination of the means disclosed in claim 1 in which control means for changing the control amount of said pressure regulating valve so as to adjust the pressure of air at the inlet of the cathode of said fuel cell to the suitable value after a predetermined time has passed, and another control means disclosed in claim 2 in which control means for reducing the changing speed of the control amount of said pressure regulating valve so as to adjust the pressure of air at the inlet of said fuel cell the suitable value at a constant proportion when the control amount of said air supplying compressor starts to be changed.

* * * * *